United States Patent
Todaka

(10) Patent No.: US 8,520,240 B2
(45) Date of Patent: Aug. 27, 2013

(54) WORK FLOW EXECUTION SYSTEM AND WORK FLOW EXECUTION METHOD

(75) Inventor: Shinji Todaka, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 795 days.

(21) Appl. No.: 12/721,429

(22) Filed: Mar. 10, 2010

(65) Prior Publication Data

US 2010/0231966 A1    Sep. 16, 2010

(30) Foreign Application Priority Data

Mar. 13, 2009    (JP) ................................. 2009-060972

(51) Int. Cl.
*G06F 15/00* (2006.01)
*G06K 1/00* (2006.01)

(52) U.S. Cl.
USPC ........................ 358/1.15; 358/1.13; 358/1.14

(58) Field of Classification Search
None
See application file for complete search history.

(56) References Cited

FOREIGN PATENT DOCUMENTS

| JP | 2001-345971 A | 12/2001 |
|---|---|---|
| JP | 2006-309731 A | 11/2006 |

OTHER PUBLICATIONS

U.S. Appl. No. 12/646,057, filed Dec. 23, 2009, Makoto Mihara.

*Primary Examiner* — Thierry Pham
(74) *Attorney, Agent, or Firm* — Canon USA Inc. IP Division

(57) ABSTRACT

A work flow execution system in which a plurality of processing apparatuses executes a work flow in cooperation with each other includes a starting processing apparatus which reads a flow file and determines whether a processing apparatus including a sleep function exists in a subsequent work flow. When the processing apparatus including the sleep function exists, a command to return the sleep function when a command executed by the starting processing apparatus is received is registered to the processing apparatus including the sleep function. When the starting processing apparatus receives a command which coincides with the registered return command, the sleep mode is returned to a normal operating mode.

7 Claims, 14 Drawing Sheets

FIG.8

```
<?xml version="1.0" encoding="utf-8"?>
-<Export xmlns="http://www.xxxxx.com/ns/active/Workflow">
-<Workflow xmlns="http://www.xxxxx.com/ns/active/Workflow "id="08d83315"
owner="Domai¥UserA" date="20070615" version="1.0.1" buttonCaption="Print Research
Document" comment="" Device No="3">
-<Device id="ZZZ01176">  ~9001
  <Device Type>MPF</Device Type>
  <Device Address>192.168.9.3</Device Address>
  <Sleep Ability>Yes</Sleep Ability>  ~9002
+<Function id="Scan">
+<Function id="Web Service">
  </Device>
-<Device id="ZZZ08899">
  <Device Type>WEB SITE</Device Type>
  <Device Address>202.212.9.3</Device Address>
  <Sleep Ability>No</Sleep Ability>
+<Function id="Receive Web Service">
+<Function id="Search Document">
-<Function id="LPR Print">  ~9003
  <Item id="Protocol">LPR</Item>  ~9004
  <Item id="Port">515</Item>  ~9005
  <Item id="Delay">5</Item>
  <Item id="Doc Name">Search Document</Item>
  <Item id="Address">192.168.9.3</Item>
  </Function>
  </Device>
-<Device id="ZZZ01176">
  <Device Type>MPF</Device Type>
  <Device Address>192.168.9.3</Device Address>
  <Sleep Ability>Yes</Sleep Ability>
+<Function id="Print">
  </Device>
  </Workflow>
  </Export>
```

FIG.10

| FLOW ID<br>12001 | TRANSMISSION SOURCE<br>12002 | PROTOCOL<br>12003 | PORT NUMBER<br>12004 |
|---|---|---|---|
| 08d83315<br>09583555 | 202.212.9.3<br>202.212.9.2 | LPR<br>HTTP | 515<br>80 |

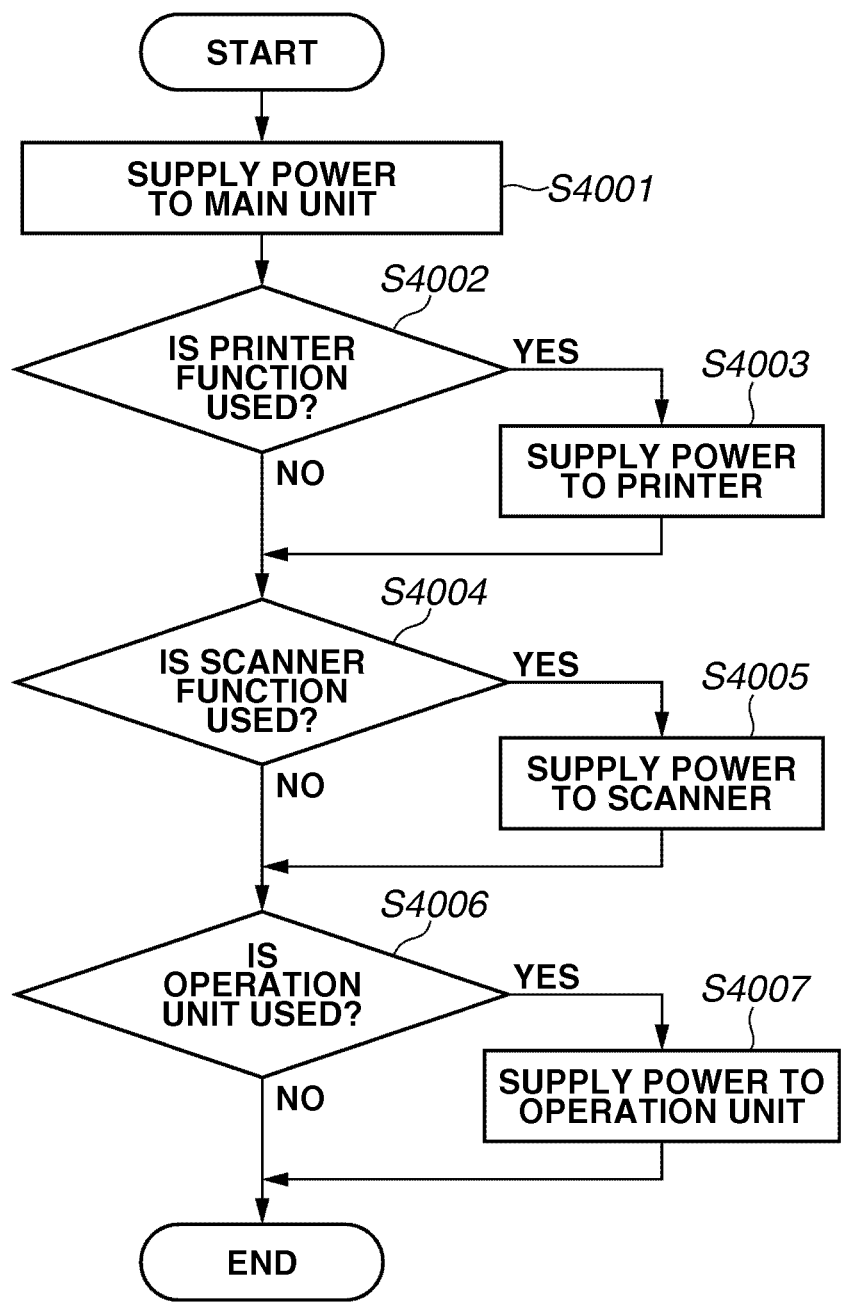

WORK FLOW EXECUTION SYSTEM AND WORK FLOW EXECUTION METHOD

BACKGROUND OF THE INVENTION

1. Field of the Invention

The present invention relates to a work flow execution system for executing work flow processing in which a plurality of information processing apparatuses and image processing apparatuses operate in cooperation with each other.

2. Description of the Related Art

In routine work, such as work flows in offices, an image processing apparatus, more specifically, a scan function or a print function provided in a multifunction peripheral is often used to register or output a document.

In such circumstances, the multifunction peripheral is required to be connected to various systems, so that the multifunction peripheral supports communication methods (protocol), such as Line Printer Daemon protocol (LPR) and Simple Network Management Protocol (SNMP), which are supported by printers from long time ago. Further, recent multifunction peripheral has supported new transmission methods, such as Web Service and Web-based distributed authoring and versioning (Web DAV) to connect to general-purpose systems.

Meanwhile, the multifunction peripheral (MFP) needs to include a power saving function in consideration of an environmental problem and power saving. As a method for returning from the power saving mode, a return instruction function using a network has been implemented.

For example, Japanese Patent Application Laid-Open No. 2001-345971 discusses a network system that utilizes a return instruction function transmitted via a network to implement processing in a plurality of apparatuses which include the power saving function. The above described Japanese Patent Application Laid-Open No. 2001-345971 discusses to transmit a command for releasing a power saving mode of an apparatus to be used in advance in the network system.

For an instruction from the network, a magic packet is generally used. However, special processing is required to transmit the magic packet.

Japanese Patent Application Laid-Open No. 2006-309731 discusses a network device in which a condition for returning from the power saving mode is registered. According to Japanese Patent Application Laid-Open No. 2006-309731, a protocol for returning from the power saving mode can be specified.

SUMMARY OF THE INVENTION

The present invention is directed to a system capable of executing a work flow while maintaining power-saving effects using a simple structure when a work flow is performed in cooperation with a plurality of processing apparatuses.

According to an aspect of the present invention, a work flow execution system is provided in which a plurality of processing apparatuses connected to a network executes a work flow in cooperation with each other according to a flow file in which a plurality of processing is described. The work flow execution system includes a processing apparatus which starts the work flow and includes a determination unit configured to determine whether a processing apparatus including a power saving mode function is described in the flow file, an instruction unit configured to extract from the flow file a command to be processed by the processing apparatus which is determined to include the power saving mode function by the determination unit and to issue an instruction to register the extracted command as a return command in the processing apparatus which executes the work flow, and a starting unit configured to start the work flow after the instruction unit has issued the instruction. The work flow execution system further includes a processing apparatus which includes the power saving mode function and includes a registration unit configured to register in a management table the return command which is received based on the instruction from the instruction unit, a return unit configured to return the power saving mode to a normal operation mode when a command is received from any other processing apparatus while an operation mode is shifted to the power saving mode and the received command coincides with the return command registered in the management table, a deletion unit configured to delete the return command registered in the management table after the return unit has returned an operation mode to the normal operation mode, and an execution unit configured to receive and execute a command following the work flow started by the starting unit after the deletion unit has deleted the return command from the management table.

According to another aspect of the present invention, a method for executing a work flow in a work flow execution system in which a plurality of processing apparatuses connected to a network executes a work flow in cooperation with each other according to a flow file in which a plurality of processing is described is provided. The method includes a controlling method for a processing apparatus which starts the work flow including determining whether a processing apparatus including a power saving mode function is described in the flow file, extracting from the flow file a command to be processed by the processing apparatus which is determined to include the power saving mode function and issuing an instruction to register the extracted command as a return command in a processing apparatus which executes the work flow, and starting the work flow after the instruction has been issued. The method further includes a controlling method for a processing apparatus including the power saving mode function including registering the return command received based on the instruction in a management table, returning the power saving mode to a normal operation mode when a command is received from any other processing apparatus while an operation mode is shifted to the power saving mode and the received command coincides with the return command registered in the management table, deleting the return command registered in the management table after the return unit has returned the operation mode to the normal operation mode, and receiving and executing a command following the work flow which is started after the return command is deleted from the management table.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 illustrates a flow file managed in the image processing apparatus.

FIG. 10 is a conceptual diagram illustrating a table managed in the image processing apparatus.

FIG. 13 is a flowchart illustrating a control method of the image processing apparatus.

DESCRIPTION OF THE EMBODIMENTS

Various exemplary embodiments, features, and aspects of the invention will be described in detail below with reference to the drawings.

For example, in a flow system which share a magic packet between processing apparatuses in advance, work flow execution can be implemented by issuing a command to return from a power saving mode before transmitting job data. However, special processing is needed before use of the magic packet. Therefore, in order to establish a more general-purpose system, it is desirable that the system can return from a power saving mode by a command as common as an LPR or hypertext markup language (HTML) command.

Figure 14A:
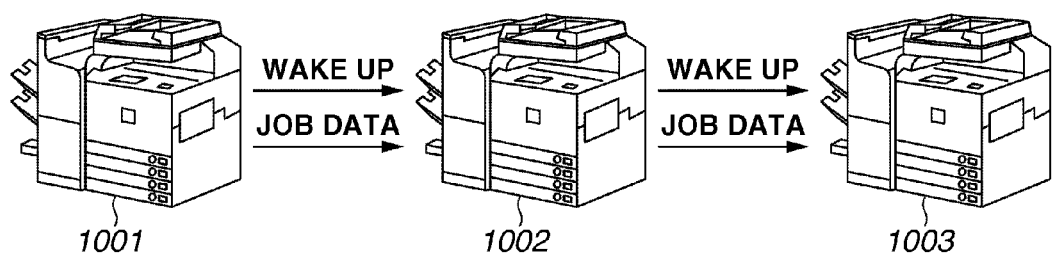
FIGS. 14A and 14B illustrate examples of an image processing apparatus.
Figure 14B:
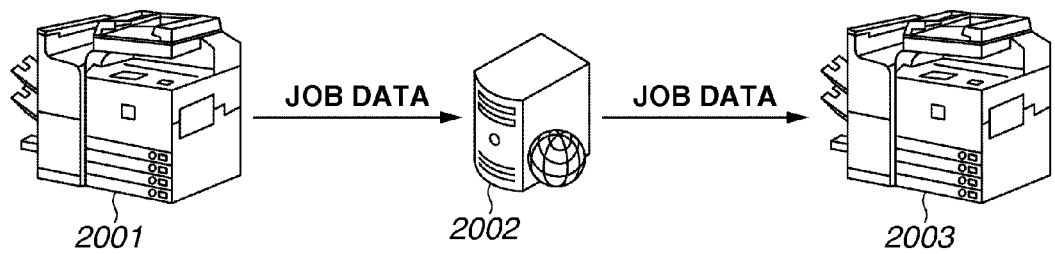

As illustrated in FIG. 14B, when a flow system which includes a general-purpose server between processing apparatuses is discussed, since a special command for a start cannot be used in the system, it is desirable that the processing apparatus returns from the power saving mode when a general-purpose command from the server is received. In this case, processing apparatuses 1001, 1002, 1003, 2001, and 2003 execute work flows, respectively. A web serve 2002 is a general-purpose server which can execute a work flow.

The present invention provides a system capable of executing a work flow while maintaining a power-saving effect using a simple structure when a work flow is performed in cooperation with a plurality of processing apparatuses. Exemplary embodiments to implement the present invention are described below referring to the drawings.

Figure 1:
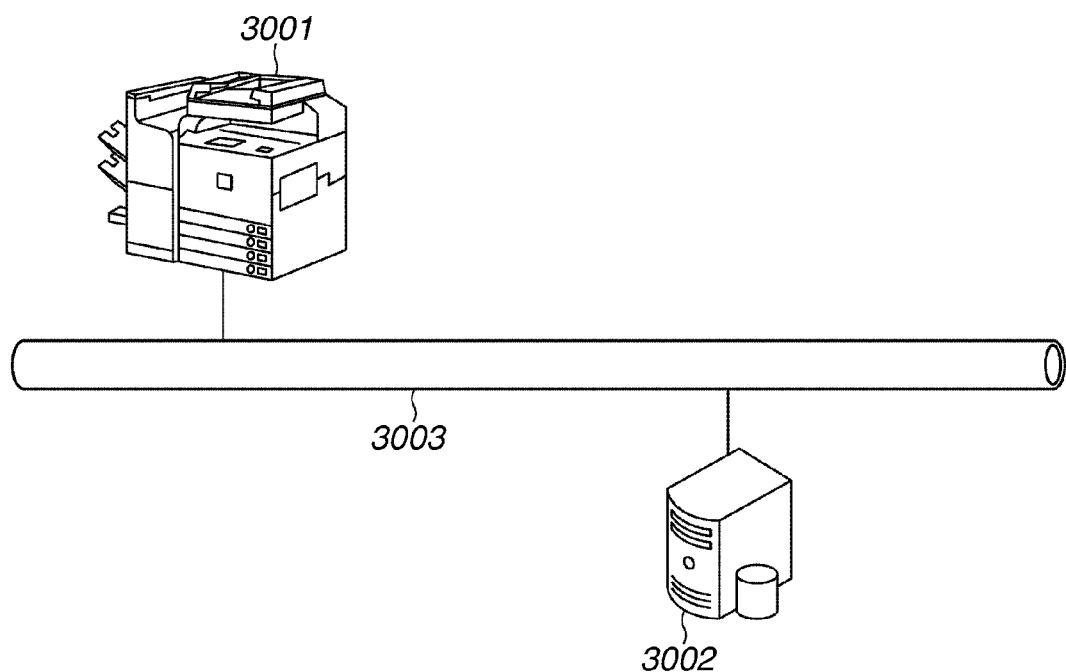
FIG. 1 illustrates an example of a work flow execution system.

FIG. 1 illustrates an example of a work flow execution system for executing a work flow according to a first exemplary embodiment. This example illustrates an image forming system in which an image processing apparatus 3001 can communicate with a web server 3002 on a network. In the description, only one image processing apparatus and one web server are included in the system, however, a plurality of image processing apparatuses and servers may be connected with each other in the image forming system.

In the present exemplary embodiment, the image processing apparatus 3001 is a Multifunction Peripheral (MFP) but may be a single function image processing apparatus, such as a printer. The image processing apparatus in the present exemplary embodiment includes a scan function, a print function, a data transmitting and receiving function, and a function to store images within the apparatus.

In the present exemplary embodiment, a processing system in which the image processing apparatus and the web server which serve as processing apparatuses execute cooperation processing according to a predetermined procedure is described as an example. However, the processing apparatuses are not limited to the above described example. The processing system may include a plurality of image processing apparatuses. Further, the present invention can be applied to a processing system configured by a plurality of server apparatuses and a plurality of image processing apparatuses which cooperate with each other. A flow file for determining a work flow, which will be described below, is described in Extensible Markup Language Schema (XMLS), however, is not limited to a flow file described in XMLS.

A processing apparatus that starts a work flow is referred to as a starting processing apparatus. The starting processing apparatus has a function of analyzing a flow file and determining whether a processing apparatus to cooperate therewith includes a power saving mode. When the starting processing apparatus executes a work flow using a processing apparatus that includes the power saving mode, the starting processing apparatus executes processing for registering in advance a command to release the power saving mode which will be described below.

In the present exemplary embodiment, a command which is set in a flow file is registered as a command to return from sleep in a processing apparatus that executes the processing. Since the command set in the flow file is used, the system can be configured in a simple structure with versatility.

In FIG. 1, the image processing apparatus 3001 that functions as the starting processing apparatus is connected to a LAN 3003, such as an Ethernet, together with a web server 3002. The image processing apparatus 3001 includes a copy function, a facsimile function, and a data transmission function of reading a document image and transmitting the read and obtained image data to each apparatus on the LAN 3003.

The image processing apparatus 3001 includes a function of analyzing Page Description Language (PDL) data and can receive and print the PDL data supplied from an information processing apparatus on the LAN 3003. Moreover, the image processing apparatus 3001 can store the data read by the apparatus 3001 itself and the PDL data supplied from the information processing apparatus connected to the LAN 3003 in a user storage area specified by a hard disk 2004 (see FIG. 2) in the image processing apparatus 3001. Further, the image processing apparatus 3001 can print image data stored in the user storage area in the hard disk 4004 in the image processing apparatus 3001. The storage function is opened to the public as a Web Service Interface, so that each apparatuses on the LAN 3003 can use the storage function.

The image processing apparatus 3001 can read a flow file which describes an image reading function, a facsimile function, and a PDL function as a multiple function, and executes processing according to described contents. The web server 3002 provides a web site for performing services, such as document registration, in cooperation with a work flow system in the web server 3002. The web server 3002 opens to the public a function of cooperating with the processing system which executes the work flow as a Web Service Interface, so that each apparatus on the LAN 3003 can use the function. In the present exemplary embodiment, the web server 3002 is located on the intranet, but may be a server on the Internet.

Figure 2:
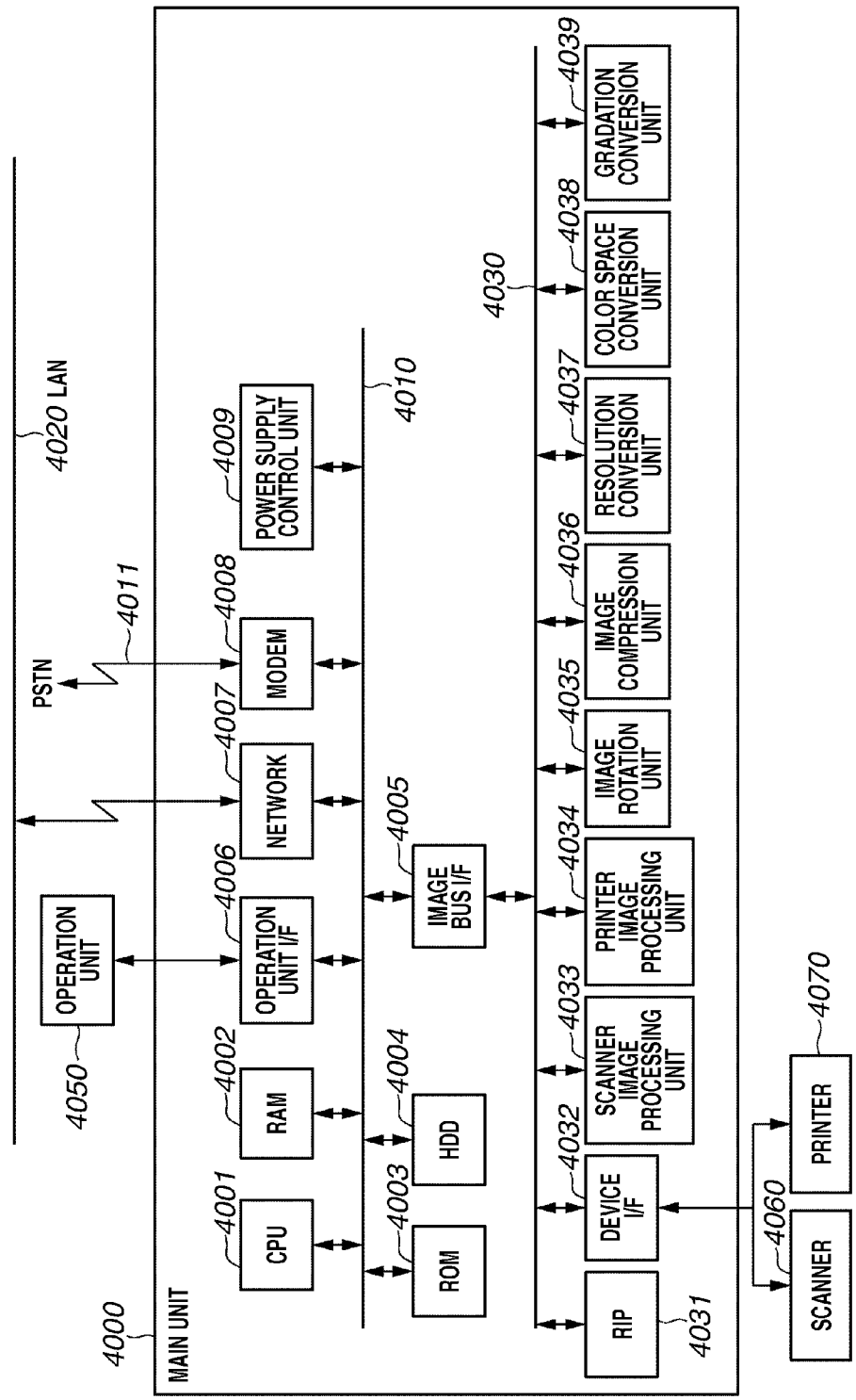
FIG. 2 is a block diagram illustrating hardware configuration of an image processing apparatus.

FIG. 2 is a block diagram illustrating hardware configuration which includes a main unit 4000 of the image processing apparatus 3001 illustrated in FIG. 1. The main unit 4000 is a controller to input and output document data, image information, and device information. The main unit 4000 is connected via a device interface (I/F) 4032 to a scanner 4060 as an image input device and a printer 4070 as an image output device. The main unit 4000 implements a scan function and a print function and also implements data transmission and reception by connecting to an external device, such as an information processing apparatus, via a LAN 4020. Further, the main unit 4000 implements a fax function by connecting to a Public Switched Telephone Network (PSTN) 4011.

An operation unit 4050 is configured to be able to display a user interface related to settings of the multiple function, and a user performs a setting corresponding to each function from the operation unit 4050. In FIG. 2, the CPU 4001 is a controller to control the whole of the main unit 4000. A random access memory (RAM) 4002 is a system work memory to operate the CPU 4001 and is used as an image memory to temporarily store image data. A read only memory (ROM) 4003 is a boot ROM which stores a boot program of the system. A hard disk drive (HDD) 4004 stores system software, the image data, attribute data thereof, and other user data. Images for temporary storage are also stored in the HDD 4004.

An operation unit I/F 4006 is an interface with the operation unit 4050 and outputs the image data to be displayed thereto. The operation unit I/F 4006 supplies the CPU 4001 with information input from the operation unit 4050 by a user of the system. A Network 4007 can connect to the LAN 4020 to input and output information from and to another MFP or any other external device, such as a personal computer (PC), connected on the LAN 4020. The present system supports TCP/IP as a network communication protocol, and communicates with external devices based on the TCP/IP communication protocol.

A Modem 4008 can connect to the PSTN 4011 to input and output image information from and to a fax apparatus located on a communication line using the fax function. A power supply control unit 4009 controls a power supply to each block in the main unit 4000, the operation unit 4050, the scanner 4060, and the printer 4070 according to an instruction from the CPU 4001. When the image processing apparatus is in the power saving mode which is provided therein, the power supply unit 4009 stops power supply to the scanner 4060, the printer 4070, and the operation unit 4050. The above described hardware resources are arranged on a system bus 4010. An Image Bus I/F 4005 is a bus bridge configured to connect between the system bus 4010 and an image bus 4030 which transfers image data at high speed, and to convert a data structure. The image bus 4030 is formed by a Peripheral Component Interconnect (PCI) or a bus IEEE1394.

Hardware resources are arranged on the image bus 4030 as follows. A raster image processor (RIP) 4031 rasterizes a PDL code input from a PC on the LAN 4020 into a bit map image. A device I/F unit 4032 connects the scanner 4060 or the printer 4070 as image input/output devices to the main unit 4000, and performs synchronous and asynchronous conversion of the image data. A scanner image processing unit 4033 corrects, processes, and edits input image data. The scanner image processing unit 4033 includes a function of determining whether an input image is a color document or a monochrome document from a saturation signal of the image, and storing a result.

A printer image processing unit 4034 corrects, processes, and edits output image data. In cooperation with the scanner image processing unit 4033, an image rotation unit 4035 reads an image from the scanner 4060, and simultaneously rotates the image and stores it in a memory. The image rotation unit 4035 can rotate the image in the memory, store the image in the memory, and print out the image stored in the memory, while rotating the image in cooperation with the printer image processing unit 4034.

A resolution conversion unit 4037 converts resolution of the image in the memory, and stores it in the memory. A color space conversion unit 4038 converts, for example, a YUV image in the memory into a Lab image by a matrix operation, and stores the image in the memory.

A gradation conversion unit 4039 converts, for example, an image with 8-bit 256 gradations in the memory into an image with 1-bit 2 gradations by a method, such as an error diffusion technique, and stores the image in the memory. An image compression unit 4036 performs compression and decompression processing on multivalued image data by Joint Photographic Experts Group (JPEG), and on binary image data by various methods, such as Joint Bi-level Image Experts Group (JBIG), Modified Modified Read (MMR), Modified Read (MR), and Modified Huffman (MH). The image rotating unit 4035, the resolution conversion unit 4037, the color space conversion unit 4038, the gradation conversion unit 4039, and the image compression unit 4036 can be operated by being connected with each other. Therefore, when an image in the memory is rotated and converted its resolution, for example, these two items of processing can be performed without intermediary of the memory.

Figure 3:
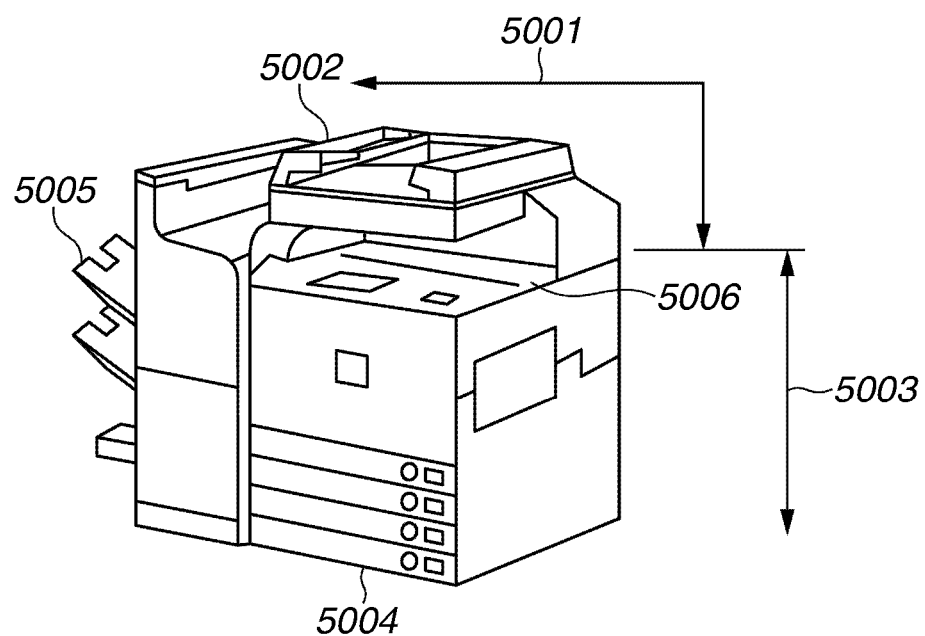
FIG. 3 is a perspective view illustrating an external appearance of the image processing apparatus.

FIG. 3 is a perspective view illustrating an external appearance of the image processing apparatus illustrated in FIG. 1. The image processing apparatus is provided to a user as a multifunction peripheral which includes a document copy function, a fax function, a printer function, and a document management function. In FIG. 3, a scanner unit 5001 as an image input device converts an image on paper of an original document into an electrical signal as raster image data by illuminating the image, and causing a charge coupled device (CCD) line sensor to scan. A document sheet is set in a tray of a document feeder 5002. When a user of the system inputs an instruction to start reading from an operation unit 5006, the CPU 4001 illustrated in FIG. 2 ordered the scanner to execute scanning. Accordingly, the document feeder 5002 feeds the document sheet one by one, and the scanner starts to read the document.

A printer unit 5003 as an image output device converts the raster image data into an image on a sheet. The printer unit 5003 may adopt any printing method, such as an electrophotographic method which uses a photosensitive drum and a photosensitive belt, and an inkjet method which prints an image directly to the sheet by ejecting ink from a micro-nozzle array thereto. Printing is started by an instruction from the CPU 4001.

The printer unit 5003 is provided with a plurality of sheet feed stages including sheet cassettes so that it can support different paper sizes and different paper orientations, and use the sheet cassette accordingly. A discharge tray 5005 receives a printed sheet thereon, and can be set to perform processing, such as sorting and stapling, according to an instruction by the CPU 4001.

Figure 4:
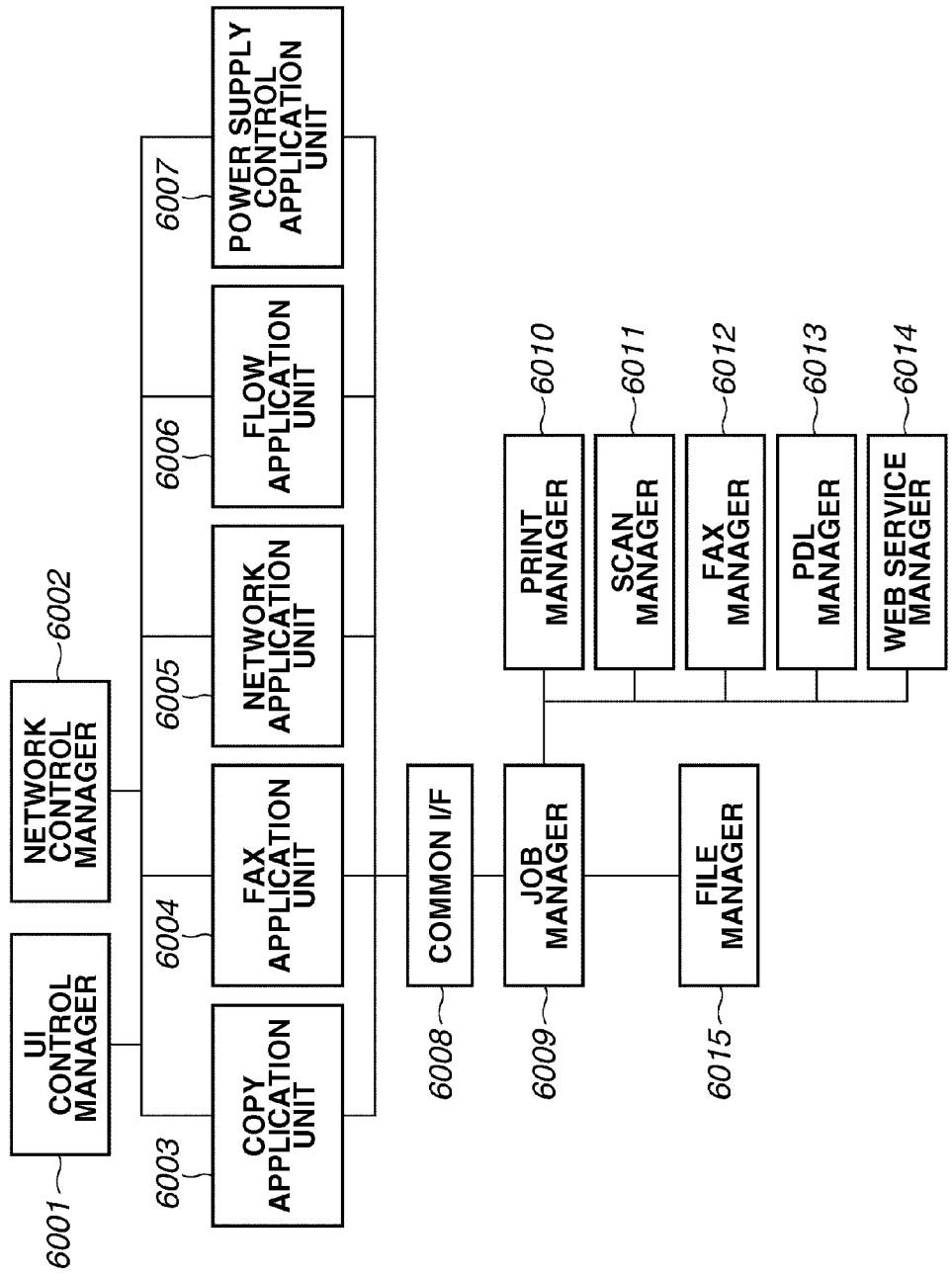
FIG. 4 is a block diagram illustrating software configuration of the image processing apparatus.

FIG. 4 is a block diagram illustrating software configuration of the image processing apparatus illustrated in FIG. 1. Items of software to be described below are stored in the hard disk (HDD) 4004 illustrated in FIG. 2. The CPU 4001 loads the software in the RAM 4002 and executes various types of processing.

In FIG. 4, a user interface (UI) control manager 6001 controls a user interface to be displayed on the operation unit 4050. The UI control manager 6001 performs control to transmit an instruction from the user to a module on a lower layer and to display information from the lower layer to the user interface.

A network control manager 6002 controls reception of an instruction or information from the network, and controls transmission of an instruction or information from the main unit 4000. A copy application unit 6003 receives an instruction from the UI control manager 6001 or the network control manager 6002, and generates a job file for executing a copy job. A fax application unit 6004 receives an instruction from the UI control manager 6001 or the network control manager 6002, and generates a job file for executing a fax job.

In responding to the instruction from the UI control manager 6001 or the network control manager 6002, a network application unit 6005 generates a job file for executing a network job A flow application unit 6006 receives an instruction from the UI control manager 6001, and executes a flow file application on the flow file stored in advance. The flow application unit 6006 performs processing, such as analyzing a flow file, and requesting the network control manager 6002 to register a return command in a flow executing apparatus used in the flow.

A power supply control application unit 6007 registers a command to return from a power saving mode received from the network control manager 6002. The power supply control application unit 6007 analyzes a command received during the power saving mode, and determines whether to return from the power saving mode. The power supply control application unit 6007 further performs processing to determine whether the command received during the power saving mode satisfies a condition for returning from the power saving mode. Returning only the functions related to the flow from the power saving mode is executed based on a determination by the power supply control application unit 6007 as to whether the command received during the power saving mode satisfies the condition for returning from the power saving mode. When the power supply control application unit 6007 determines that the command received during the power saving mode satisfies the condition for returning from the power saving mode, after return processing from the power saving mode is performed, the processing is terminated by delivering the command to the network application unit 6005.

A common interface unit (common I/F) 6008 is provided to absorb a device-dependent component of the device control block. A job manager 6009 organizes items of job information or individual jobs in the flow file received from the common interface unit 6008, and transmits the items of information and the jobs to function-specific managers closely related to devices of the lower layer. When the function to be executed is local copy, the job manager 6009 performs processing, such as starting, synchronization, and ending of the scan manager 6011 and the print manager 6010. When the function to be executed is a fax transmission job, the job manager 6009 performs processing, such as starting, synchronization, and ending of the scan manager 6011 and the file manager 6015 for document storage, and the fax manager 6012.

When the function to be executed is PDL print, such as LISP and PostScript, the job manager 6009 performs processing, such as starting, synchronization, and ending of a PDL manager 6013, the file manager 6015, and the print manager 6010. The job manager 6009 further processes a job in which a plurality of types of processing is combined transmitted from the flow application unit 6006. A web service manager 6014 is used when a web service function of an object apparatus is used to execute a flow in a plurality of devices. The file manager 6015 stores and extracts image data and a job file which are used in a job to and from the HDD 4004.

Figure 5:
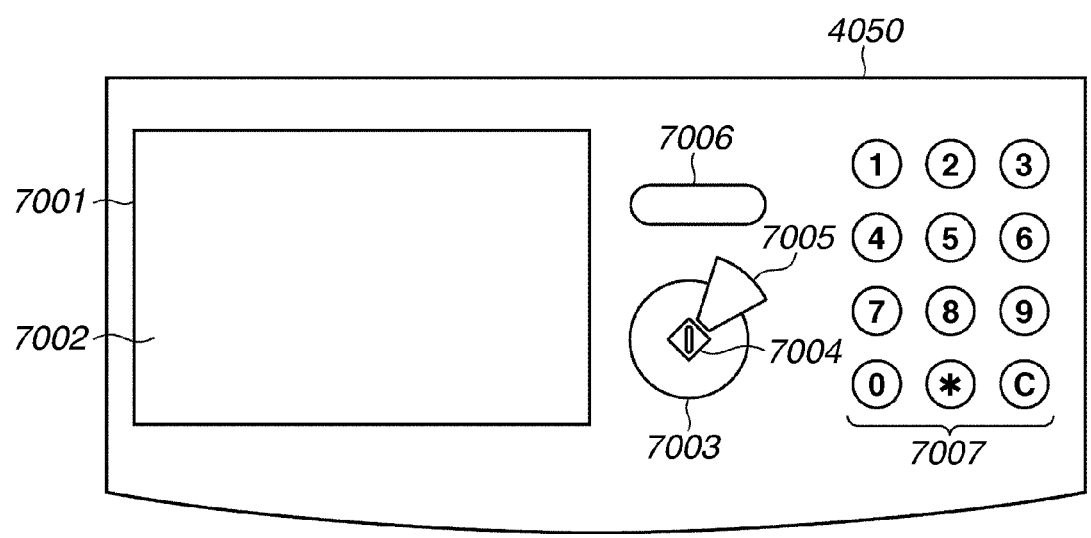
FIG. 5 illustrates a configuration of an operation unit.

FIG. 5 illustrates the configuration of the operation unit 4050 illustrated in FIG. 2. In FIG. 5, a liquid crystal display (LCD) display unit 7001 includes a touch panel sheet 7002 attached thereto, and displays an operation screen of the system and soft keys. On the LCD display unit 7001, when a key on the touch panel sheet 7002 is pressed, its position information is transmitted to he CPU 4001

A start key 7003 is used to start a read operation of a document image. In the middle of the start key 7003, there is a two-color (green and red) light-emitted diode (LED) 7004, and whether the start key 7003 can be used or not is indicated by these two colors. A stop key 7005 stops an operation currently executing. A reset key 7006 is used to initialize settings set by the operation unit. Numerical keypads 7007 are used to input a fax number, a number of copies, or the like. A button to instruct the start of the flow is displayed on the LCD display unit 7001 and can be operated by a soft key of the touch panel sheet 7002.

Figure 6:
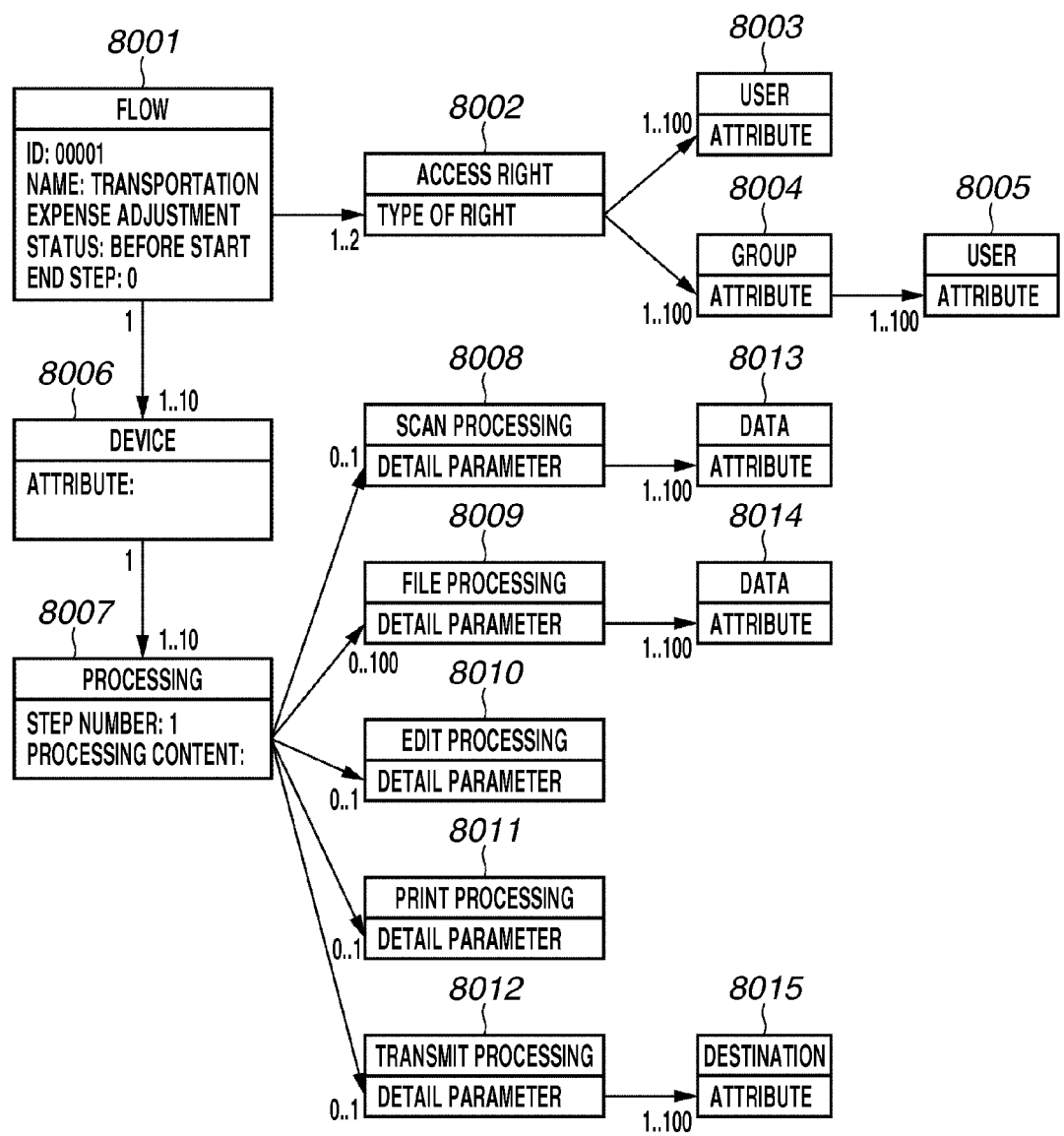
FIG. 6 illustrates an object structure of a flow stored in a hard disk drive (HDD).

FIG. 6 illustrates a concept of object structure of a flow stored in the HDD 4004 illustrated in FIG. 2. The image processing apparatus according to the present exemplary embodiment executes a series of processing according to a flow file stored in XML format based on the object structure. A flow processing is executed when the user presses a button in a job list display on the operation screen illustrated in FIG. 7. When the flow processing is executed, the job file is duplicated on the HDD 4004, and managed by storing different statuses in the format.

In FIG. 6, a flow object 8001 includes parameters, such as ID, a flow name, a status by which statuses in the execution of the flow is managed, and an end step to store the step at which the flow ends. A right to access the flow is managed by an access right object 8002.

The access right object 8002 includes a type of right as a parameter, and stores the types of right, an execution right and an edit right. The access right object 8002 gives a user or a group which has a set right to user objects 8003, 8005 and a group object 8004. A device object 8006 manages an image processing apparatus as a target which executes the processing. The device object 8006 stores as parameters attributes related to a processing apparatus, such as an address of the processing apparatus and presence/absence of the power saving function. In the present exemplary embodiment, whether to register a condition for the power saving mode in the image processing apparatus which executes the processing is determined according to information stored in the device object 8006.

A processing object 8007 manages processing to be actually executed. The processing object 8007 includes parameters in which a step number in an order of processing and a processing content representing a content and a type of processing are described. The processing object 8007 is linked to any one of objects 8008 to 8012 that manage detail parameters according to the processing contents. In the present exemplary embodiment, only items of processing related to the image processing apparatus are described, however, functions that are performed on the server side can be stored as objects. A scan processing object 8008 stores detailed scan setting as a parameter. After scanning is finished, the scan processing object 8008 is linked to a data object 8013 to manage scanned data.

A file processing object 8009 is linked to the processing object 8007 when a file stored in the HDD 4004 is used as data. The file processing object 8009 is linked to a data object 8014. An edit processing object 8010 is a management object to edit a file obtained by the scan processing or the file processing. The edit processing includes merge processing and page delete processing. A print processing object 8011 manages detail parameters in printing, such as 2 in 1 printing or two-sided printing. A transmit processing object 8012 manages detail parameters in transmission, such as simple mail transfer protocol (SMTP) processing, server message block (SMB) processing, file transfer protocol (FTP) processing, and Web Service processing. A destination information object 8015 manages destination information in transmission processing.

Figure 7:
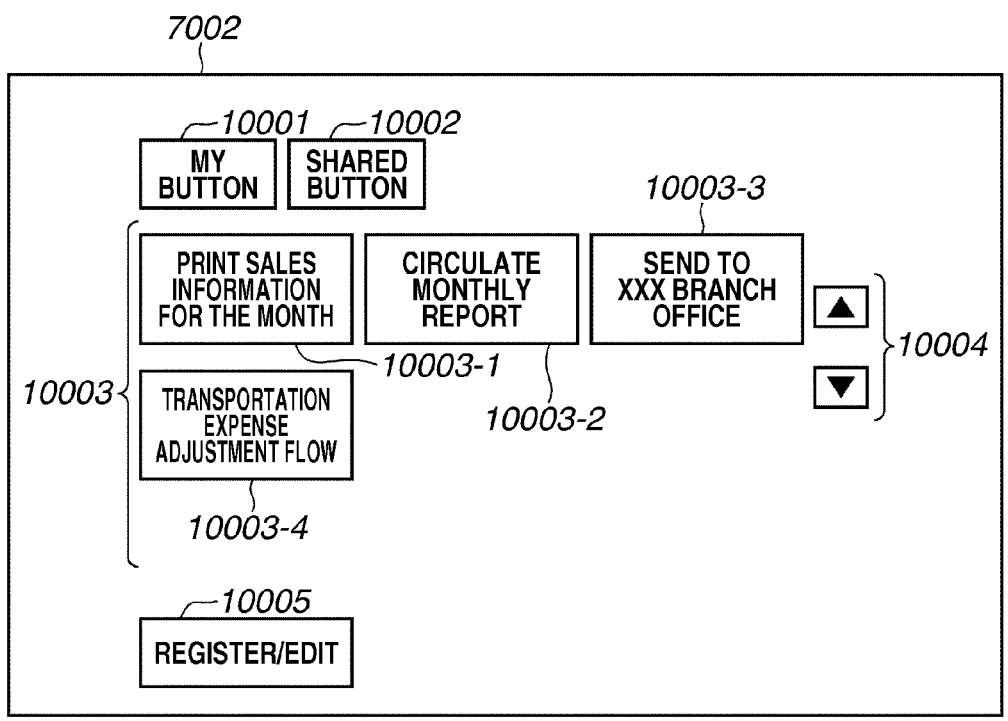
FIG. 7 illustrates a screen structure of a list of flows displayed on the operation unit.

FIG. 7 illustrates a screen structure of a list of flows displayed on the LCD display unit 7002 of the operation unit 4050 illustrated in FIG. 2. In FIG. 7, a flow list 10003 includes registered flow list (FL) buttons 10003-1 to 10003-4. The names of flows are indicated on those FL buttons 10003-1 to 10003-4. The user can execute one of the registered flows by pressing one of the FL buttons 10003-1 to 10003-4 with a desired flow name.

When a My button 10001 is pressed, the flow an access right to which is only provided to a logged-in user is displayed in the area of the flow list 10003. When a shared button 10002 is pressed, a job the access right is to which is given to other users is displayed in the area of the flow list 10003. Scroll buttons 10004 are used when all flows could not be displayed in the area of the flow list 10003. A register/edit button 10005 is used to register a new flow or to edit an existing flow.

FIG. 8 illustrates an example of a flow file managed by the image processing apparatus according to the present exemplary embodiment. This example illustrates an actual flow file in a system configuration illustrated in FIG. 1. In this example, the flow file is described in XML format, but may be described in other file formats.

The processing of the flow file is to transmit a search request to the web server 3002 based on a document scanned by the scanner function of the image processing apparatus 3001. When a search result from the web server 3002 is received, the image processing apparatus 3001 outputs the result by LPR print. More specifically, the image processing apparatus 3001 serves as the processing apparatus to start a flow and also serves as one of the processing apparatuses that execute a flow included in the flow. Because the processing apparatuses here are the processing apparatuses cooperating with the others to execute a work flow, the system may be formed by one image processing apparatus and one web server as discussed in the present exemplary embodiment, or may be formed by a plurality of image processing apparatuses.

In FIG. 8, a tag 9001 indicates the device object, and ID which can uniquely identify a processing apparatus in the processing system is assigned to the tag. Subsequent tags indicate attributes of the processing apparatus which include a type and an address of the processing apparatus.

A tag 9002 is used to determine whether the processing apparatus includes a power saving mode. If the content of the tag 9002 includes Yes, it is determined that the processing apparatus includes the power saving mode, and if Yes is not included, it is determined that the processing apparatus does not have the power saving mode. A tag 9003 indicates a processing object (Function id). The tag 9003 includes a tag 9004 which represents attributes, such as a processing protocol and a port. A condition for returning from the power saving mode is registered in the processing apparatus that actually executes the processing in the flow file based on those items of information. The tag 9004 can include delay information. The delay information is set when there is a possibility that the processing apparatus which executes processing takes time to return from the power saving mode to the normal operation mode. When transmission of a command fails, after a lapse of the delay time, the command is transmitted again. Accordingly, a situation that the mode returns again to the power saving mode can be effectively avoided.

Figure 9:
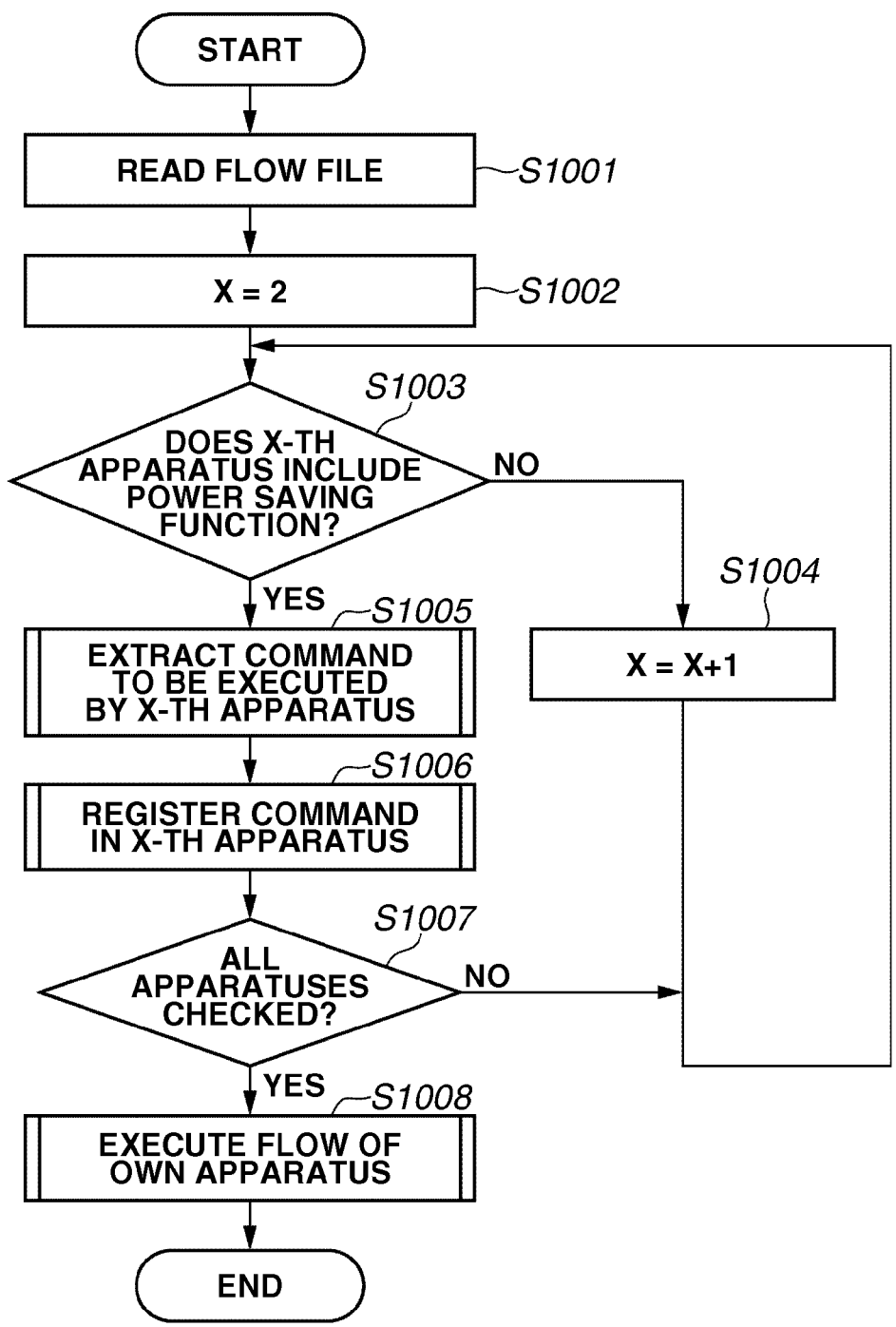
FIG. 9 is a flowchart illustrating a control method of the image processing apparatus.

FIG. 9 is a flowchart illustrating a control method in the image processing apparatus according to the present exemplary embodiment. This example illustrates processing from when a user presses a FL button on the image processing apparatus until flow processing is executed. Each of the steps from S1001 to S1008 are implemented by the CPU 4001 loading a control program into the RAM 4002 and executing the control program. The control program corresponds to the flow application unit 6006.

When the user presses a desired FL button among the buttons corresponding to the flows displayed in the list on the operation unit 4050, in step S1001, the selected flow file is read. The processing is executed in the flow application unit 6006 according to an instruction from the UI control manager 6001. Assuming that the read flow file is the example illustrated in FIG. 8, the following processing is described.

In step S1002, the flow application unit 6006 substitutes "2" for a variable x of an internal counter. The variable x corresponds to a sequential order of a device object in the flow, and if x is "2", for example, this indicates the second processing apparatus in the flow. According to the flow file in FIG. 8 which is read by the flow application unit 6006, the tag 9001 specifies the first processing apparatus.

In step S1003, the flow application unit 6006 determines whether the x-th processing apparatus as a processing target includes the power saving mode. If it is determined that the power saving mode is included (YES in step S1003), the processing proceeds to step S1005. If it is determined that the power saving mode is not included (No in step S1003), the processing proceeds to step S1004.

More specifically, the flow application unit 6006 determines whether a value of a <Sleep Ability> tag of the target device in the flow file illustrated in FIG. 8 is Yes. Since the value of <Sleep Ability> tag of the second processing apparatus is No, the processing proceeds to step S1004. In step S1004, the flow application unit 6006 increments x by 1 (x=x+1) to check the next processing apparatus. After incrementing the x, the processing returns to step S1003, and the flow application unit 6006 determines whether the next processing apparatus includes the power saving mode.

For example, when the flow file in FIG. 8 is processed, in step S1004, the count is increased from "2" to "3", and in step S1003, the flow application unit 6006 determines on the value of <Sleep Ability> of the third device (id="ZZZ01176") in the flow. Since the value <Sleep Ability> of the third device is Yes, the processing proceeds to step S1005.

In step S1005, a command to be processed by the x-th processing apparatus is extracted. Since the command is used to return from the power saving mode, a processing command to be executed first is extracted.

Referring to the flow file in FIG. 8, a command that the third image processing apparatus receives from the second image processing apparatus corresponds to the final processing by the second image processing apparatus. A command LPR Print specified by the tag 9003 in FIG. 8 corresponds to this processing and a command to be extracted is "Protocol: LPR and Port: 515" specified by a tag 9005. In the present exemplary embodiment, the command is extracted for the final processing of the previous image processing apparatus, but the command may be described as a first processing parameter of the target image processing apparatus in the flow file In step S1006, the command extracted in step S1005 is registered in the x-th execution target processing apparatus, as a condition for returning from sleep. The processing is performed via the network when necessary. If the target processing apparatus has already been in the power saving mode, the processing apparatus is made to return from the power saving mode by transmitting a Magic Packet to the processing apparatus in advance, and execute the processing.

More specifically, since a third processing apparatus is an own image processing apparatus 3001, the processing can be executed by writing the command in a management table (see FIG. 12) in one's own apparatus.

In step S1007, the flow application unit 6006 determines whether all the processing apparatuses in the flow have been checked. In the present exemplary embodiment, the processing apparatuses are checked sequentially. Therefore, if the flow application unit 6006 determines that there is no tag of a next device in the flow (YES in step S1007), the processing proceeds to step S1008. On the other hand, if the flow application unit 6006 determines that there is a tag of a next device in the flow (NO in step S1007), the processing returns to step S1004 and the tag of a remaining device is checked.

Referring to the example in FIG. 8, since there is no tag of a next device in the flow, it is determined that processing has been executed for all the processing apparatuses in the flow, and the processing proceeds to step S1008. Thus, a registration processing of the condition for returning from the power saving mode which is a feature of the present exemplary embodiment has been finished. Then, in step 1008, the flow processing to be executed by the own apparatus is executed, and the processing in FIG. 8 ends.

Referring to the flow file in FIG. 8 as an example, the flow processing to be executed by the own apparatus includes scanning of a document, searching by Web Service of an address 202.212.9.3 based on the scanned document, and completing the processing.

FIG. 10 is a conceptual diagram illustrating an example of a table managed by the image processing apparatus according to the present exemplary embodiment. This is an example of a table for managing the condition for returning from the power saving mode managed in the image processing apparatus which executes the flow. The table is stored in the RAM 4002, and based on this table, the power control application unit 6007 performs power supply control. In the example of this table, a return command is registered for each flow ID to register a return command on every flow job basis. In the present exemplary embodiment, a registered job can be deleted on every flow job basis.

Though not illustrated in the table, when it takes time for the sleeping processing apparatus to return from the power saving mode, it may be arranged that the delay time can be specified from when the processing apparatus as the starting source transmits a return command until data is actually transmitted. In FIG. 10, a flow ID 12001, a command transmission source 12002, a command protocol 12003, and a port number 12004 are managed in this table. For example, when the flow file in FIG. 8 is executed, information on the uppermost line is registered in the table.

Figure 11:
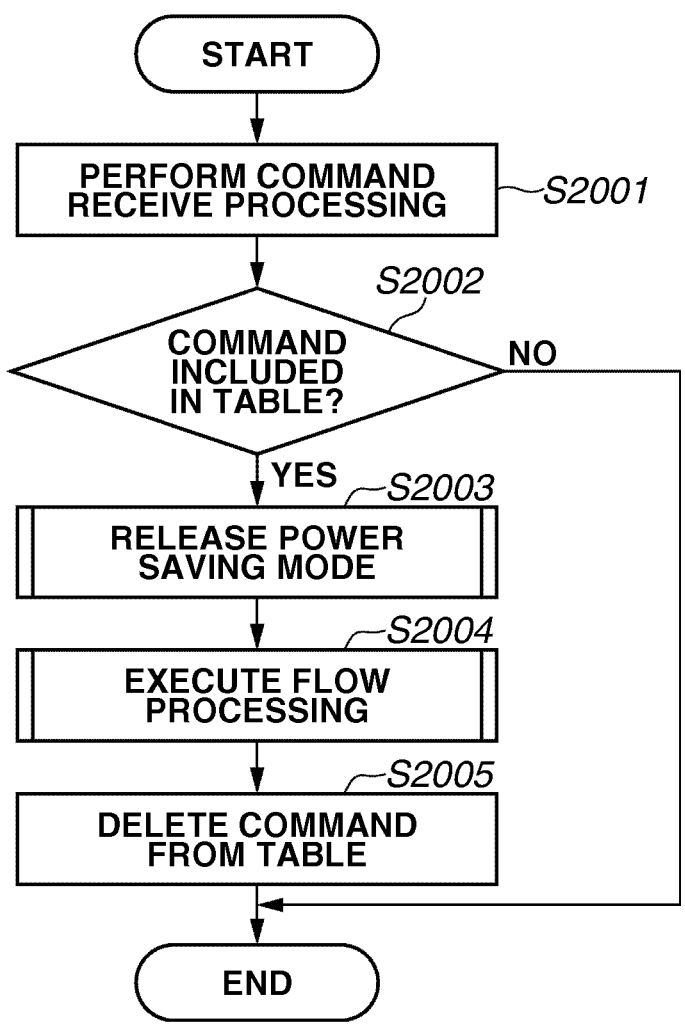
FIG. 11 is a flowchart illustrating a control method of the image processing apparatus.

FIG. 11 is a flowchart illustrating a control method in the image processing apparatus according to the present exemplary embodiment. This example illustrates processing from when the image processing apparatus in the power saving mode receives a command which coincides with the command registered therein until the image processing apparatus executes the flow. Each of the steps from S2001 to S2005 are implemented by the CPU 4001 loading the control program into the RAM 4002 and executing the control program.

The power saving mode in the present exemplary embodiment is a state in which the power supply to the scanner 4060, the printer 4070, and the operation unit 4050 is stopped by the power supply control unit 4009. The power continues to be supplied to the main unit 4000, and the operation for returning from the power saving mode to the normal operation mode is executed by the power supply control application unit 6007.

In step S2001, the power supply control application unit 6007 executes processing to receive a command from another processing apparatus during the power saving mode. Then, in step S2002, the power supply control application unit 6007 determines based on content of the command and port number information whether the command is included in the management table for the condition for returning from the power saving mode illustrated in FIG. 10.

When the power supply control application unit 6007 determines that the command is not included in the management table illustrated in FIG. 10 (NO in step S2002), the received command is discarded, and the processing is terminated.

On the other hand, in step S2002, if the power supply control application unit 6007 determines that the command is included in the management table illustrated in FIG. 10 (YES in step S2002), the processing proceeds to step S2003. In step S2003, the return processing from the power saving mode is executed. The return processing is executed by an instruction form the power supply control unit 4009 to start power supply to the units to which power supply has been turned off.

When the processing apparatus that received the command returns from the power saving mode, in step S2004, the power supply control application unit 6007 executes flow processing instructed by the command. When the flow processing is completed, in step S2005, the power supply control application unit 6007 deletes the command from the management table illustrated in FIG. 10, and the processing is terminated.

Processing by the processing apparatus on a side that receives the command is described in association with the flow file illustrated in FIG. 8. In the present exemplary embodiment, the processing apparatus which is configured by the web server 3002 performs web search processing, and transmits a search result to the image processing apparatus 3001.

The power supply control application unit 6007 of the processing apparatus which receives the command in step S2001 determines whether a command corresponding to the condition for returning from the power saving mode is registered in the management table in step S2002. In the case of the flow file in FIG. 8, in order to receive a LPR command, by a port 515, from the web server 3002 with an address "202.212.9.3", the power supply control application unit 6007 determines whether a command which satisfies the conditions is registered in the management table for the return condition. Since the condition on the uppermost line in the management table in FIG. 10 satisfies the condition, in step S2004, the power supply control application unit 6007 releases the power saving mode, and print processing which is the received command is executed. Then, the power supply control application unit 6007 deletes the uppermost line condition from the management table for the return condition, and the processing is terminated.

Figure 12:
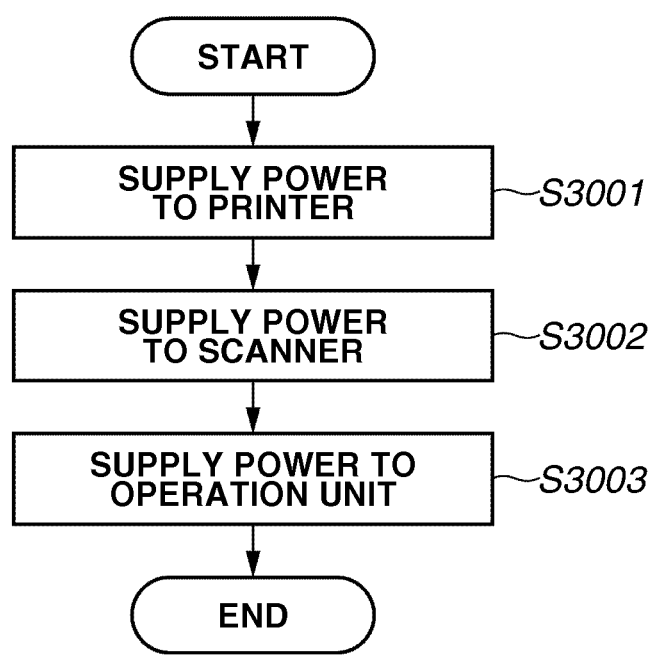
FIG. 12 is a flowchart illustrating a control method of the image processing apparatus.

According to this arrangement, a command to release the power saving mode may not be continuously stored in the processing apparatus after one flow file has been executed FIG. 12 is a flowchart illustrating a control method in the image processing apparatus according to the present exemplary embodiment. This is a processing example for supplying power to the image processing apparatus in the power saving mode. Each of the steps from S3001 to S3003 are implemented by the CPU 4001 loading a control program into the RAM 4002 and executing the control program. The control operation is performed by the power supply control unit according to an instruction from the power supply control application unit 6007.

Power is supplied to the printer 4070 in step S3001, to the scanner 4060 in step S3002, and to the operation unit in step S3003, and the processing is terminated.

In the above described exemplary embodiment, processing in the power saving mode from step S2001 to step S2003 is executed, with the main unit included. As another exemplary embodiment, those steps can be executed by the Network 4007. In this exemplary embodiment, the power supply can be limited only to the network unit, so that power can be saved efficiently.

FIG. 13 is a flowchart illustrating a control method in the image processing apparatus according to the present exemplary embodiment. This example illustrates processing for supplying power to various devices from the power saving mode when the Network 4007 execute the power saving mode processing. Each of the steps from S4001 to S4007 are implemented by the CPU 4001 loading the control program into the RAM 4002 and executing the control program.

In step S4001, the Network 4007 starts to supply power to the main unit 4000.

In step S4002, the Network 4007 determines whether the flow to be executed by its own processing apparatus uses the printer function. If the Network 4007 determines that the printer function is used (YES in step S4002), then in step S4003, the Network 4007 supplies power to the printer 4070. And the processing proceeds to step S4004. On the other hand, if the Network 4007 determines that the printer function is not used (NO in step S4002), the processing proceeds to step S4004. In step S4004, the Network 4007 determines whether the flow to be executed by its own processing apparatus uses the scanner function. If the Network 4007 determines that the scanner function is used (YES in step S4004), then in step S4005, the Network 4007 supplies power to the scanner unit, and the processing advances to step S4006.

On the other hand, if it is determines that the scanner function is not used (NO in step S4004), then in step S4006, the Network 4007 determines whether the flow to be executed by its own processing apparatus uses the operation unit 4050. If the Network 4007 determines that the operation unit 4050 is used (YES in step S4006), then in step S4007, the Network 4007 supplies power to the operation unit 4050, and the processing is terminated.

On the other hand, if it is determined that the operation unit is not used (NO in step S4006), the processing is terminated.

Therefore, when the processing apparatus receives a registered command from another processing apparatus that starts the flow file, the processing apparatus supplies power to the units which are used in the cooperation processing.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-060972 Mar. 13, 2009, which is hereby incorporated by reference herein in its entirety.

What is claimed is:

1. A work flow execution system in which a plurality of processing apparatuses connected to a network executes a work flow in cooperation with each other according to a flow file in which a plurality of processing is described, the work flow execution system comprising:

a processing apparatus which starts the work flow comprising:

a determination unit configured to determine whether a processing apparatus including a power saving mode function is described in the flow file;

an instruction unit configured to extract from the flow file a command to be processed by the processing apparatus which is determined to include the power saving mode function by the determination unit and to issue an instruction to register the extracted command as a return command in the processing apparatus which executes the work flow; and a starting unit configured to start the work flow after the instruction unit has issued the instruction, and a processing apparatus which includes the power saving mode function comprising:

a registration unit configured to register in a management table the return command which is received based on the instruction from the instruction unit;

a return unit configured to return the power saving mode to a normal operation mode when a command is received from any other processing apparatus while an operation mode is shifted to the power saving mode and the received command coincides with the return command registered in the management table;

a deletion unit configured to delete the return command registered in the management table after the return unit has returned an operation mode to the normal operation mode; and an execution unit configured to receive and execute a command following the work flow started by the starting unit after the deletion unit has deleted the return command from the management table.

2. The work flow execution system according to claim 1, wherein the return command can specify a flow ID, a type of protocol, a port number, a transmission source, and a delay time until data transmission.

3. The work flow execution system according to claim 1, wherein the processing apparatus includes an image processing apparatus and an information processing apparatus.

4. A method for executing a work flow in a work flow execution system in which a plurality of processing apparatuses connected to a network executes a work flow in cooperation with each other according to a flow file in which a plurality of processing is described, the method comprising:

a controlling method for a processing apparatus which starts the work flow comprising:

determining whether a processing apparatus including a power saving mode function is described in the flow file;

extracting from the flow file a command to be processed by the processing apparatus which is determined to include the power saving mode function and issuing an instruction to register the extracted command as a return command in a processing apparatus which executes the work flow; and starting the work flow after the instruction has been issued, and a controlling method for a processing apparatus including the power saving mode function comprising:

registering the return command received based on the instruction in a management table;

returning the power saving mode to a normal operation mode when a command is received from any other processing apparatus while an operation mode is shifted to the power saving mode and the received command coincides with the return command registered in the management table;

deleting the return command registered in the management table after the return unit has returned the operation mode to the normal operation mode; and receiving and executing a command following the work flow which is started after the return command is deleted from the management table.

5. The method according to claim 4, wherein the return command can specify a flow ID, a type of protocol, a port number, a transmission source, and a delay time until data transmission.

6. The method according to claim 4, wherein the processing apparatus includes an image processing apparatus and an information processing apparatus.

7. A non-transitory computer-readable storage medium storing a program configured to execute the method according to claim 4.

* * * * *